United States Patent
Schuler

(10) Patent No.: US 9,079,335 B2
(45) Date of Patent: Jul. 14, 2015

(54) METHOD AND DEVICE FOR PREPARING A PASTE-LIKE COMPOUND FOR SEALING AN INSULATING GLASS PANE

(75) Inventor: Peter Schuler, Tiefenbronn (DE)

(73) Assignee: Bystronic Lenhardt GmbH, Neuhausen-Hamberg (DE)

( * ) Notice: Subject to any disclaimer, the term of this patent is extended or adjusted under 35 U.S.C. 154(b) by 726 days.

(21) Appl. No.: 13/377,013

(22) PCT Filed: Jun. 8, 2010

(86) PCT No.: PCT/EP2010/003455
§ 371 (c)(1),
(2), (4) Date: Dec. 8, 2011

(87) PCT Pub. No.: WO2010/142428
PCT Pub. Date: Dec. 16, 2010

(65) Prior Publication Data
US 2012/0080136 A1    Apr. 5, 2012

(30) Foreign Application Priority Data
Jun. 9, 2009 (DE) .......................... 10 2009 024 939

(51) Int. Cl.
| | |
|---|---|
| B29B 7/60 | (2006.01) |
| B29B 7/40 | (2006.01) |
| B29B 7/74 | (2006.01) |
| B29C 47/36 | (2006.01) |

(52) U.S. Cl.
CPC ................ B29B 7/603 (2013.01); B29B 7/407 (2013.01); B29B 7/7442 (2013.01); B29B 7/7447 (2013.01); B29C 47/364 (2013.01)

(58) Field of Classification Search
None
See application file for complete search history.

(56) References Cited

U.S. PATENT DOCUMENTS

| | | | | | |
|---|---|---|---|---|---|
| 2,768,405 | A | * | 10/1956 | Mineah | 366/103 |
| 3,894,722 | A | | 7/1975 | Jones | |
| 4,234,372 | A | * | 11/1980 | Bernhard et al. | 156/356 |
| 8,480,940 | B2 | * | 7/2013 | Schuler | 264/261 |
| 2008/0225638 | A1 | * | 9/2008 | Bien et al. | 366/318 |
| 2009/0291238 | A1 | * | 11/2009 | Scott et al. | 428/34 |
| 2010/0320644 | A1 | | 12/2010 | Schuler | |

FOREIGN PATENT DOCUMENTS

| | | |
|---|---|---|
| DE | 3542767 | 6/1987 |
| DE | 3929608 | 3/1990 |
| DE | 4445946 | 12/1995 |
| DE | 102007051610 | 4/2009 |
| EP | 1375008 | * 1/2004 |

* cited by examiner

*Primary Examiner* — Jeffrey Wollschlager
(74) *Attorney, Agent, or Firm* — D. Peter Hochberg; Sean F. Mellino

(57) ABSTRACT

A method and device for preparing a paste-like compound having at least two constituents which set after having been mixed. The mixed compound is injected into an intermediate space between two glass panels of an insulating glass pane by delivering the at least two constituents from storage containers into separate intermediate storage units from which they are delivered into a mixer in which the constituents are mixed while passing through the mixer. The compound leaving the mixer is injected into the intermediate space between the two glass panels by a nozzle which has at least one opening directed into the intermediate space between the glass panels. The nozzle is moved along the edge of at least one of the two glass panels. The constituents of the paste-like compound are pumped using gear pumps from the intermediate storage units into the mixer, where they are dynamically mixed by motor-driven mixing elements.

26 Claims, 2 Drawing Sheets

METHOD AND DEVICE FOR PREPARING A PASTE-LIKE COMPOUND FOR SEALING AN INSULATING GLASS PANE

CROSS-REFERENCE TO RELATED APPLICATIONS

This application is a National Stage application of International Application No. PCT/EP2010/003455, filed on Jun. 8, 2010, which claims priority of German application number 10 2009 024 939.7, filed on Jun. 9, 2009, both of which are incorporated herein by reference in their entireties.

BACKGROUND OF THE INVENTION

1. Field of the Invention

The present invention relates to a method and device for preparing a paste-like compound for sealing an insulating glass pane.

2. Description of the Prior Art

The invention is based on a device comprising the features specified in the preamble of claim 1. Such a state of the art is known from DE 35 42 767 A1 and from DE 39 29 608 A1, which disclose a device for delivering two highly viscous substances in the predetermined proportion from two storage containers to a nozzle, by means of which the edge joint of an insulating glass pane is sealed. The two highly viscous substances, which are the two components of a two-component sealing and adhesive compound, are in each case delivered by means of piston pumps from barrels into an intermediate storage unit, which is a piston-cylinder unit, from which a first piston presses the main component (binder or base component) of the sealing and adhesive compound and a second piston presses the additional component (hardener) synchronous to the main component. Main component and additional component are delivered on the delivery path between the piston-cylinder unit and the nozzle by means of a static mixer in which they are mixed with each other.

In the event that the supply of the main component and of the additional component in the piston-cylinder unit comes to an end, the sealing process of the insulating glass pane must be interrupted to refill the main component and the additional component into the respective piston-cylinder unit. During this time, a sealing of insulating glass panes is not possible. When attempting to avoid interruptions of the sealing process, the storage volume of the piston-cylinder unit must be chosen as large as possible. Due to the inevitable compressibility and due to a thixotropic behavior of the constituents of the sealing and adhesive compound, the accurate metering thereof to the extent that neither too much nor too little of the compound reaches into the edge joint of the insulating glass pane becomes more difficult, with an increasing size of the storage volume. The impact of the compressibility and the thixotropic characteristics of the paste-like compound is important in particular because pressures of from 200 bar to 250 bar must be applied for the delivery of the paste-like compound. The weight of the piston-cylinder units, the amount of force required for the actuation thereof, the pressure on the material, which is to be delivered, and thus also the weight for the drives of the pistons of the piston-cylinder units furthermore increase with an increasing storage volume.

To keep the delivery paths from the piston-cylinder units to the nozzles short, it is known to arrange the nozzle and the piston-cylinder units, which feed the nozzle, on a common carrier. This carrier must be movable, so as to be able to move the nozzle along the edge of the insulating glass pane. The effort for the motion drive also increases with the weight of the piston-cylinder units.

SUMMARY OF THE PRESENT INVENTION

The instant invention is based on the object of showing a way, of how the effort for the sealing of insulating glass panes can be decreased and of how the metering accuracy can be increased during sealing.

This object is solved by a method comprising the features in accordance with the present invention and by a device comprising the features in accordance with the present invention. Advantageous further developments of the invention are the subject matter of the subclaims.

The method according to the invention for preparing a paste-like compound consisting of at least two constituents, which sets after the constituents that are initially present in separate storage containers have been mixed, and for injecting the setting, paste-like component into an intermediate space between two glass panels of an insulating glass pane starts with the delivery of the at least two constituents from the storage containers, which preferably are barrels, into separate intermediate storage units, is disclosed herein. By means of gear pumps, the constituents are delivered from the intermediate storage units into a dynamic mixer, in which they are mixed with one another by means of motor-driven mixing elements. The setting, paste-like compound leaving the mixer reaches into a nozzle, which has at least one opening, which is directed into the intermediate space between the glass panels of the insulating glass pane. The setting, paste-like compound, which is formed by means of the mixing, is injected into the intermediate space between the two glass panels by means of the nozzle, while the nozzle is moved along the edge of at least one of the two glass panels.

The combination of a dynamic mixer, in which the constituents of the paste-like compound are mixed with one another by means of motor-driven mixing elements, with gear pumps, which supply the constituents to the dynamic mixer, and in each case with one intermediate storage unit for the at least two constituents, which are to be mixed with one another, from which the gear pumps draw the respective constituent and supply it to the dynamic mixer, brought considerable progress for the sealing of insulating glass panes, a "quantum leap" in the technology of sealing insulating glass panes. This explosive progress was in view of the fact of not providing for it. With the use of a dynamic mixer in combination with gear pumps, which feed it, and with intermediate storage units, from which the gear pumps obtain material, the instant invention makes a complete shift. Many important advantages are obtained through this as set forth below.

The loss of pressure, which the paste-like compound suffers when it is delivered through a dynamic mixer, is considerably smaller than the loss of pressure, which it suffers in a static mixer. In a sealing device, which encompasses a static mixer, the constituents of the paste-like compound must be pressed out of the intermediate storage units, from which the static mixer is fed, at a pressure, which is typically 200 bar to 250 bar in response to not-to-small distances between the glass panels of an insulating glass pane. The largest portion of the pressure of 200 bar to 250 bar, drops on the way to the nozzle; the paste-like compound arrives at the nozzle at a pressure, which is typically only 70 bar to 80 bar, so that the loss of pressure up to that point is approximately ⅔ of the initial pressure. The lion's share of the loss of pressure is caused by the static mixer. With the use of a dynamic mixer, at least a large portion of the loss of pressure, which otherwise occurs in the case of a static mixer, can be avoided.

Due to the highly decreased loss of pressure, the power demand for pressing out the paste-like compound decreases.

Decreased initial pressure and decreased power demand for pressing out the paste-like compound make it possible to use lighter intermediate storage units and lighter pumps.

With the weight savings, the intermediate storage units, the pumps and the mixer can be moved easier together with the nozzle; the drive for the common movement can be designed so as to be weaker, which saves further weight.

The movement of lighter intermediate storage units and of lighter delivery devices provides for lighter holders and guides for these things, which again saves weight.

With the decrease of the mass of the sealing device, which is to be moved, the tendency thereof to undesired vibrations decreases and the attenuation thereof is facilitated.

Lower pressures, smaller power demand and smaller masses lead to a higher durability, in particular in the case of the intermediate storage units and the pumps as well as in the case of their seals.

Based on the same mixing results, the capacity of the dynamic mixer and the dwell time of the paste-like compound are considerably smaller in the dynamic mixer than in a static mixer. The volume of the paste-like compound, which is located between the intermediate storage units and the nozzle decreases through this. The impact of the compressibility and of the thixotropy of the paste-like compound on the metering accuracy is reduced due to the smaller volume, so that the metering accuracy is increased.

The extent of the setting of the paste-like compound, which already occurs on the way to the nozzle, is decreased with the decrease of the through-put time of the paste-like compound through the mixer.

Due to the fact that the dynamic mixer requires a smaller capacity than a static mixer and due to the fact that the dwell time of the material in the dynamic mixer is shorter than in the static mixer, the danger that material accumulates in dead spots of the mixer and sets is not as high as in the case of a static mixer. The driven mixing elements contribute to this advantage in that they keep the paste-like compound in motion in the dynamic mixer by force.

In sealing devices for insulating glass panes, static mixers typically have a length of 80 cm to more than 1 m. A dynamic mixer having a corresponding performance like a static mixer is very much shorter and more compact than the static mixer. Through this, a sealing device by means of which the method according to the invention is realized is designed overall in a more compact manner, through which its tendency to vibrate is decreased once again.

A sealing device, which operates according to the invention, comprising a dynamic mixer can be produced in a more cost-efficient manner than a common sealing device comprising a static mixer.

Sealing compounds for insulating glass panes are more or less shear thickening, that is, their viscosity increases with an increasing pressure, to which the compound is subjected. Due to the fact that a sealing device, which operates according to the invention, requires less pressure than known sealing devices for insulating glass panes, the shear thickening sealing compounds have a lower viscosity in a sealing device, which operates according to the invention, than in a common sealing device. According to the invention, they can thus be processed easier. This already applies for the most widely known THIOKOL®. However, the advantage of the invention is most pronounced in response to the processing of two-component sealing compounds on the basis of a silicone, which set into a silicone caoutchouc; at best, these sealing compounds can only then be processed on a common sealing device, which is equipped with a static mixer, when only relatively small flow capacities of the paste-like sealing compound are required at the nozzle, as it is the case with insulating glass panes, in which the distance between the glass panels is not more than 10 mm. Insulating glass panes, in the case of which the distance between the glass panels is 15 mm to 25 mm, are manufactured predominantly today due to the fact, however, that the heat insulation of an insulating glass pane becomes better, the larger the distance of the glass panels from one another in the insulating glass pane. When a silicone, which sets into a silicone caoutchouc, should be used as sealing compound, this was only possible on known sealing devices when a drop in the sealing speed was accepted, that is, the required lowering of the pressure in the sealing device resulted in a corresponding decrease of the flow capacity and with this a decrease of the sealing speed, which, in turn, resulted in an extension of the clock cycle of the insulating glass production line. According to the invention, however, it is possible to process the silicone with flow capacities, which are as large as required for insulating glass panes comprising a large distance between the glass panels, so as to be able to fully utilize the short clock cycle of modern insulating glass production lines. The instant invention is thus not only suitable for the use of THIOKOL® as sealing compound, but also for the use of polyurethane and in particular of silicone, which sets into silicone caoutchouc as two-component sealing compound.

It turned out unexpectedly that the gear pumps have a high durability in the combination according to the invention, even though they process paste-like compounds, which include abrasive fillers.

The combination according to the invention provides for an interruption-free pressing of the paste-like compound from the nozzle as long as the supply in the storage container lasts, which is typically a 200 liter barrel. The possibility of metering the paste-like compound without interruptions is not limited by the capacity of the intermediate storage containers. The intermediate storage containers can thus be small and light.

The range of the flow capacities of paste-like compound is considerably greater in the case of a device, which operates according to the method according to the invention, than in the state of the art. It was possible to already realize flow capacities of 0.1 liters per minute to 10 liters per minute in the same device.

The method according to the invention can be carried out efficiently and can be used in a versatile manner for the sealing of insulating glass panes. The reached progress is astounding.

For preparing a paste-like compound of at least two constituents, which set after having been mixed with one another, and for injecting a strand of the paste-like compound into the intermediate space between two glass panels of an insulating glass pane, the device according to the invention has delivering the constituents from storage containers into separate intermediate storage units and further through a mixer, which is embodied as a dynamic mixer, to a nozzle, which can be moved along an edge of the insulating glass pane with an opening, which is directed into the intermediate space between the two glass panels of the insulating glass pane. Constituents of the paste-like compound, which are to be mixed with one another, are supplied to the mixer by means of gear pumps, which are arranged in the delivery path between the respective intermediate storage unit and the dynamic mixer. The above-mentioned advantages of the invention apply to the device according to the invention as well as to the method.

The paste-like compound serves the purpose of sealing the interior space of the insulating glass pane against the permeation of water vapor and/or to establish a permanent and sufficiently solid bond between the two glass panels. A setting compound, which is formed from at least two constituents that are mixed with one another, is used for a sufficiently solid bond. Initially, the compound created by means of the mixing is paste-like and then sets continuously, whereby it solidifies. Setting two-component sealing and adhesive compounds on the basis of THIOKOL® are particularly common for sealing the edge joint of insulating glass panes; they set into polysulfides.

Advantageously, the gear pumps are driven synchronously, so as to ensure a constant mixing ratio of the constituents of the paste-like compound. Preferably, the constituents of the paste-like, setting compound are delivered to the gear pumps at a input pressure. The output of the gear pump can be influenced with the input pressure. Preferably, a constant input pressure is applied to the gear pumps. This has the advantage that pressure fluctuations, which occur in the delivery path from the storage containers to the gear pumps, do not impact the output of the gear pumps. This is advantageous for reaching a high metering accuracy of the sealing device. It is not necessary for the same input pressure to be applied to the gear pumps for the different constituents of the paste-like compound, but the same input pressure is preferably applied thereto.

A suitable input pressure for the gear pumps lies between 20 bar and 50 bar. A input pressure of 30 bar to 40 bar is particularly preferred.

Preferably, an input pressure is applied to the gear pumps in that an input pressure is applied to the intermediate storage units. Each intermediate storage unit is connected to the input side of one of the gear pumps. In the event that an input pressure is applied to the intermediate storage units, this is a particularly advantageous possibility of compensating pressure fluctuations in the duct path between the storage containers and the respective intermediate storage container.

A constant input pressure on the input side of the respective gear pump is advantageously reached in that the input pressure is measured on the input side and the measured value of the input pressure is compared to the reference value of the input pressure and the input pressure of the gear pump is then regulated to the reference value in that the input pressure in the intermediate storage unit is controlled in a suitable manner.

When pressurizing the intermediate storage containers at a certain input pressure, this has the further advantage that the refilling of the intermediate storage containers from the storage containers assigned to them can be controlled. As long as an intermediate storage container does not obtain any supplies from the storage container, its volume decreases. The decreasing content can be monitored by means of a fill level sensor, which, in the case of a predetermined minimal content, gives a signal for refilling to a pump, which is assigned to the respective storage container, and which refills the constituent in question until the content in the intermediate storage container has reached a predetermined maximum, which is detected by the fill level sensor, which then stops the refilling process again.

In a possible alternative of the method according to the invention, the gear pumps, to which the constituents, which are to be pumped, are delivered at an input pressure, should increase the pressure prevailing on the pressure side of the gear pumps by up to 20 bar. Despite this increase, the pressure with which the constituents, which are to be mixed, reach into the dynamic mixer, is still smaller by a factor of 3 or 4 than the pressure, with which the constituents in the state of the art are supplied to a static mixer. This is responsible for a part of the advantages of the invention. Preferably, the gear pumps are operated in such a manner that the pressure on their pressure side is only up to 10 bar higher than the input pressure, which is applied to their input side.

The aim of another alternative of the method according to the invention is to minimize the loss of pressure, which the paste-like compound suffers between the input (pressure side) and the output of the gear pumps. It would be best if no loss of pressure at all occurs at the gear pump. To attain this, the loss of pressure is preferably regulated to the value zero. For this purpose, the input pressure can be measured upstream of the input of the gear pump and the pressure can be measured at the output of the gear pump and the speed of the gear pump can be regulated such that the pressure difference (the loss of pressure) is almost zero. In the event that the input pressure is greater than the pressure at the output of the gear pump, the speed of the gear pump is increased. In the event that the input pressure of the gear pump is smaller than the pressure at the output of the gear pump, the speed is reduced. The input pressure is preferably maintained to be constant.

This alternative of the method has the advantage that the gap losses in the gear pump and the wear on the gear pump are particularly small. A further advantage is that such a mode of operation is not only suitable for large flow capacities, but in particular also for small flow capacities, as they are required for the sealing of solar modules, e.g., in which solar cells are arranged between two glass panes, which must be tightly connected to one another on their edge.

The intermediate storage units are preferably piston-cylinder units, the pistons of which press onto the content of the cylinder at the desired input pressure. For refilling such an intermediate storage unit, the respective constituent is delivered from a storage container into the intermediate storage unit, into which it enters at a pressure, which is greater than the input pressure, so that the piston draws back. The refilling process is stopped at the latest when the piston stops in its retracted end position. In the event that the constituent is removed from the cylinder by means of a gear pump, the piston is pushed ahead again by means of the pressure applied thereon. The next refilling process is started before the piston reaches its forward final position, which can be monitored by means of a sensor.

Another advantageous embodiment of an intermediate storage unit is a bladder reservoir. A bladder reservoir consists of a housing and an accumulator bladder, which is connected to an air compressor, e.g., which keeps the pressure in the accumulator bladder constant. The space in the housing outside of the accumulator bladder can then be filled with the paste-like constituent, which the gear pump is to pump to the mixer. By changing the volume of the accumulator bladder in response to a constant input pressure, the volume of the paste-like constituents in the bladder reservoir can vary. The bladder reservoir can also be embodied as a membrane reservoir. In the case of a membrane reservoir, the separation between the compressed air and the paste-like compound is not made through a bladder or a balloon, but through a membrane, which divides the housing into two chambers.

The pressure in the respective intermediate storage unit can be controlled by means of a control loop, in which the input pressure, which prevails between the intermediate storage unit and the gear pump assigned thereto, is compared to a predetermined reference input pressure and in which the pressure in the respective intermediate storage unit is controlled depending on the deviation of the actual value from the reference value.

Preferably, the dynamic mixer has a cylindrical or truncated cone-shaped mixing tube, in which a drivable mixing shaft is arranged as mixing tool, which mixing shaft is provided with mixing elements, which project from the mixing shaft. The mixing elements preferably project radially from the mixing shaft and reach close to the peripheral wall of the mixing tube, which is located on the inside of the mixing tube, so that the entire clear opening of the mixing tube is reached by the mixing elements and the materials, which are to be mixed, cannot settle and set in the mixing tube.

The mixing elements can be arranged irregularly around the mixing shaft; they can also be arranged behind one another on the mixing shaft in a plurality of circular arrangements. It is particularly preferred when the mixing elements are arranged helically around the mixing shaft, because this is the best way to ensure that the mixing elements pass over all of the areas of the surface located on the inside of the mixing tube.

The mixing elements can have different shapes: They can be rods having a cross section, which is embodied to be round or rectangular. They can be blades or brackets. Mixing elements, which are embodied in a shovel-like manner, are also advantageous. In particular, they can be embodied such that they have surfaces, which point in delivery direction and which are arranged at an angle to the longitudinal axis of the mixing shaft, which differs from 90°, such that they effect an advance of the paste-like compound in response to a driven mixing shaft. In so doing, the loss of pressure, which the material suffers in the dynamic mixer, can be reduced drastically or can be made to disappear. It is even possible to compensate a loss of pressure, which has been suffered on the way from the storage unit to the dynamic mixer.

It is particularly advantageous to combine mixing elements, which can generate an advance, with other mixing elements, which do not generate an advance, but which have a greater mixing effect.

A mixing tube, in which one or two worms are arranged so as to be capable of being driven, is also possible as a dynamic mixer.

In the case of the device according to the invention, the flow cross section of the mixer and its driving power are advantageously designed for a flow capacity of the paste-like compound of 0.1 liters per minute to 10 liters per minute. The latter makes the device particularly suitable for quickly sealing insulating glass panes with a large space between the glass panels.

The invention is particularly suitable for two-component sealing and adhesive compounds, such as the polysulfides (THIOKOL®), which are known in the production of insulating glass and which consist of a main constituent and an additional constituent, which are mixed with one another on their way to the nozzle at a ratio of approx. 9 to 1 to make a two-component paste-like compound, which then proceeds to set. The invention is furthermore particularly suitable for two-component, setting compounds on the basis of polyurethane and silicone. Only the instant invention made it possible to seal insulating glass panes with an air gap of more than 15 mm with a sealing compound on the basis of a two-component silicone.

In response to the sealing of an insulating glass pane, the setting compound is injected into the edge joint of the insulating glass pane, which is defined by two glass panels and the outer side of a spacer connecting the glass panels, in such a manner that it either extends from the one glass panel to the opposite glass panel as a uniform strand or—in case of sufficient compression and tension-proof spacers—that it is only filled into the fillets between the outer side of the spacer and the two glass panels. In the last-mentioned case, two separated strands of the sealing compound are located next to one another in the edge joint. Two such strands can be generated by means of one nozzle, which has two openings, which are located next to one another.

The nozzle can have one or more than one opening. It is possible to work with only one opening when a uniform strand of the paste-like compound is to be formed. A nozzle comprising two openings can not only be used when—as mentioned—two strands, which are located next to one another, are to be formed, the one strand of which connects the spacer to the one glass panel and the other strand connects the spacer to the other glass panel. A nozzle comprising two openings can also be used when a two-layer compound strand consisting of two different paste-like compounds is to be formed.

The invention provides for sealing devices, which are so compact that not only storage units for the constituents of one single sealing compound, such as for example THIOKOL®, on a commonly moved carrier can be assigned to one nozzle, but a larger number of storage units for the constituents of different sealing compounds, e.g., for THIOKOL® and polyurethane or for THIOKOL® and silicone or for all three sealing compounds. Even in such a case, the sealing device does not yet reach the weight of a common sealing device for only one sealing compound. Such a sealing device can be switched from the processing of one sealing compound to the processing of another sealing compound in a comfortable, time-efficient and cost-efficient manner by means of one or several valves, in particular by means of a multi-way valve, if necessary by changing to another dynamic mixer and to another nozzle.

BRIEF DESCRIPTION OF THE DRAWINGS

Further features and advantages of the invention result from the enclosed description of exemplary embodiments of the invention, which are illustrated in the enclosed drawings. In the exemplary embodiments, the same parts or corresponding parts are identified with corresponding reference numerals.

DETAILED DESCRIPTION OF THE PRESENT INVENTION

Figure 1:
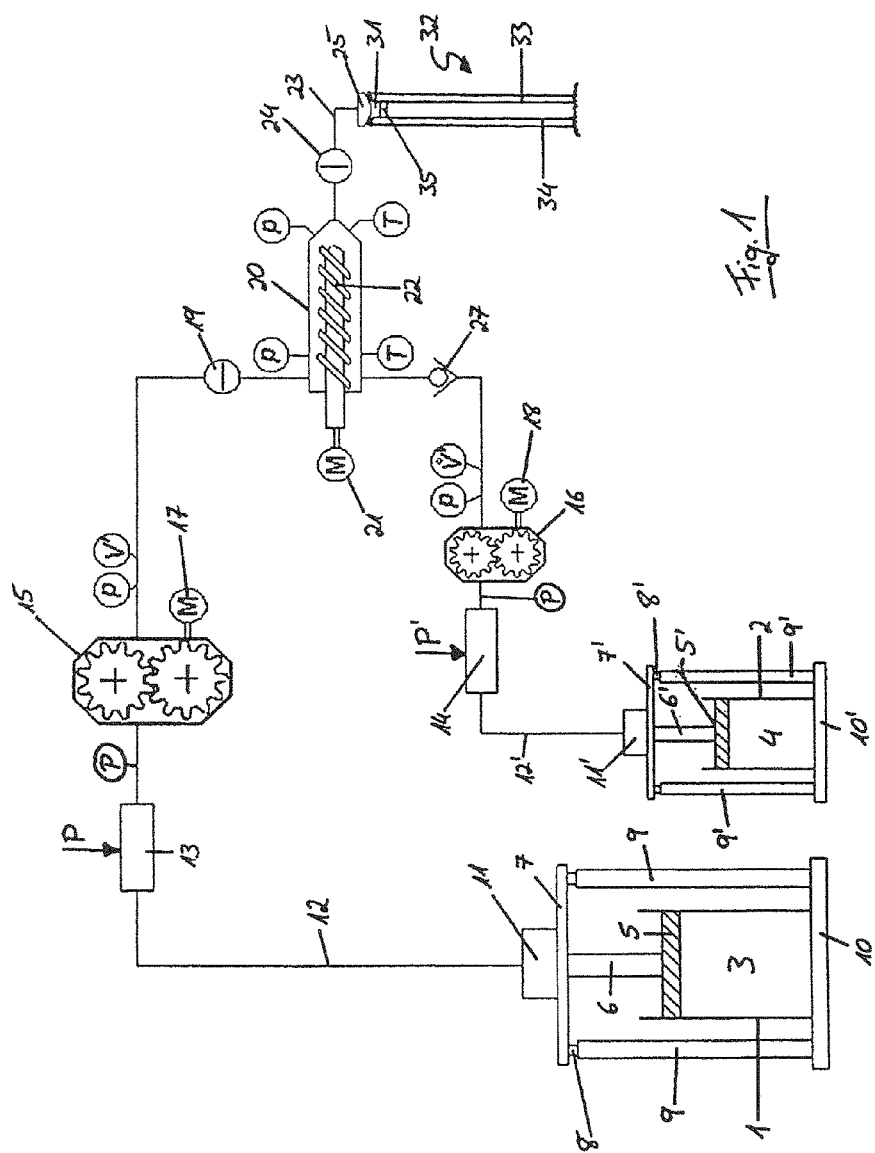
FIG. 1 shows a schematic illustration of a device for injecting a paste-like compound into the intermediate space between two glass panels of an insulating glass pane.

FIG. 1 shows a container 1 for a first constituent 3 of a paste-like compound and a container 2 for a second constituent 4 of the paste-like compound. The two containers are barrels, e.g., the lids of which are removed. A follower plate 5 is located on the first constituent 3 in the container 1. From the follower plate 5, a rod 6 leads perpendicularly upwards to a cross beam 7, which does not only connect the rod 6, but also two piston rods 8, which belong to two hydraulic cylinders 9, which are anchored on a base plate 10, on which the container 1 stands. By retracting the piston rods 8 into the hydraulic cylinders 9, the cross beam 7 presses the follower plate 5 onto the supply of the constituent 3 of the paste-like compound, which is located in the container 1. Through this, the constituent 3 is pressed through an opening in the follower plate 5 into a pump 11, which is located above the follower plate 5 and which delivers the constituent 3 into a duct 12.

The second constituent 4 of the paste-like compound is located in the second container 2 and is delivered out of it the same way the first constituent 3 is delivered out of the first container 1. The devices used for this purpose are thus identified with the same reference numerals, which are provided with a line.

The barrel pump 11 pumps the constituent contained therein, which, in this example, is the "binding component" of the two-component sealing compound, which is to be produced, into an intermediate storage unit 13, which is pressurized at a input pressure P and which is connected to the input side of a gear pump 15, which is driven by means of an electric motor 17, preferably a direct current motor.

The barrel pump 11' pumps the second constituent 4, which, in this example, is the "hardening component" of the two-component sealing compound, which is to be produced, through the duct 12' into the intermediate storage unit 14, which is pressurized at a preselected pressure P' and which is connected to the input side of a second gear pump 16, which is driven by means of an electric motor 18. The two motors 17 and 18 are synchronized with one another.

The gear pump 15 delivers the constituent 3 through a duct, in which a rotary valve 19 is arranged, into a dynamic mixer 20. The other gear pump 18 delivers the constituent 4 through a duct, in which a nonreturn valve 27 is located, also into the dynamic mixer 20, which is driven by means of an electric motor 21. The dynamic mixer 20 is illustrated schematically and consists substantially of a tube, which tapers at its one end. A worm 22, which is driven by the electric motor 21, is arranged in the tube as mixing element. The dynamic mixer 20 leads into a duct 23, which leads to a nozzle 25. A rotary valve 24 is located between the dynamic mixer 20 and the nozzle 25, by means of which valve 24 the supply of the two-component sealing compound, which was created by means of mixing, to the nozzle 25 can be interrupted.

For monitoring tasks and control tasks, provision can be made in the delivery paths upstream of and downstream from the gear pumps 15 and 17 as well as at the input and at the output of the dynamic mixer 20 for sensors, which measure the pressure P and the volume flow V'. Temperature sensors T can measure the temperature in the dynamic mixer 20 and at the output of the dynamic mixer 20. In particular, the pressure upstream of and downstream from the gear pump 15 or 16, respectively, can be measured, the difference can be calculated therefrom and can be regulated by adjusting the speed of the motor 17 or 18, respectively, to the reference value zero. The preselected pressure P is adjusted in the intermediate storage unit 13 or 14, respectively, by means of a plunger piston, e.g., and is best held constant.

The nozzle 25 rests against the edge of an insulating glass pane 32, which consists of two glass panels 33 and 34 comprising a spacer 35, which is placed in between. The nozzle 25 is either moved along the edge of the insulating glass pane 32 or the insulating glass pane 32 is moved along the nozzle 25 with its edge, so as to seal the edge joint 31, which is formed on the outer side of the spacer 35 between the two glass panels 33 and 34.

Figure 2:
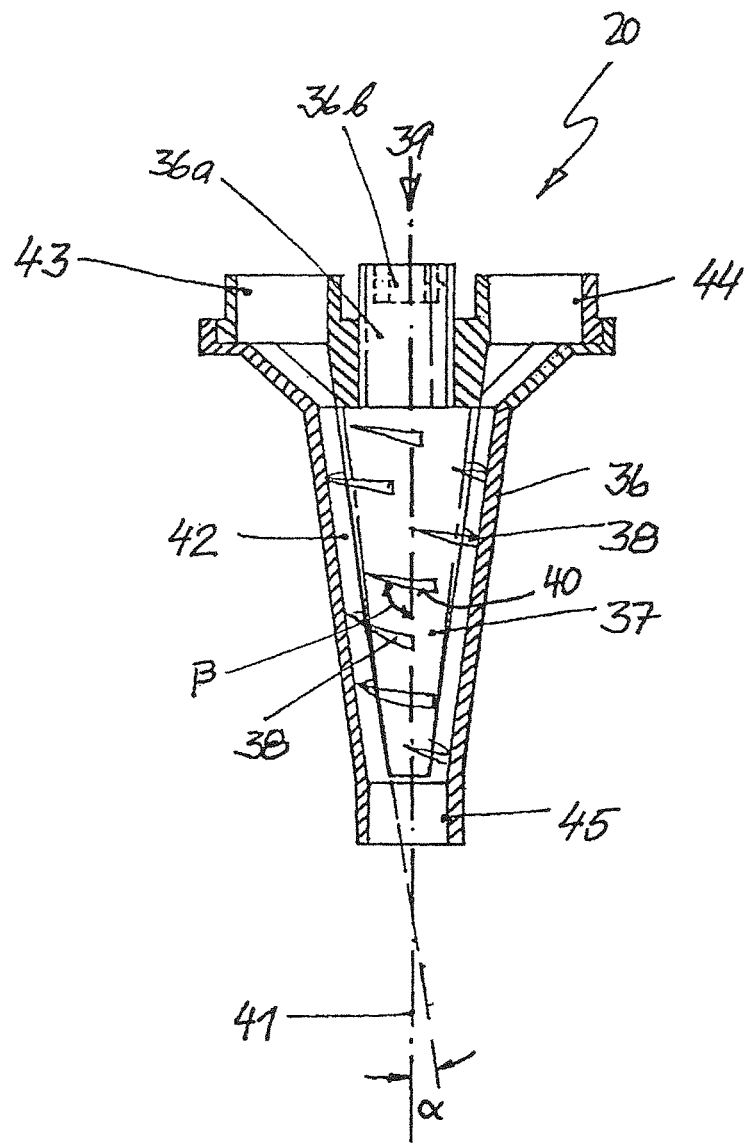
FIG. 2 shows a longitudinal section through a dynamic mixer.

FIG. 2 shows an example of a dynamic mixer 20, which has a conical mixing tube 36, in which a conical mixing shaft 37 is supported, which, in a shaft journal 36a projecting from the mixing tube 36, has a blind hole 36b having a hexagonal cross section, with which a driving shaft of a motor 21 (see FIG. 1) can engage in a positive manner.

The mixing shaft 37 has the same cone angle α as the mixing tube 36, so that an annular gap 42 of a constant width exists between both of them.

As mixing elements 38, the mixing shaft 37 supports radially projecting blades, which reach directly to the inner surface of the mixing tube 36. The mixing elements 38 have a surface 40, which points in delivery direction 39 and which is set at an angle β to the longitudinal axis 41, which differs from 90°, in such a manner that the mixing elements 38, which rotate along with the mixing shaft 37, effect an advance of the compound located in the mixer 20.

Two constituents of a setting sealing compound, which are to be mixed, are supplied through two inlet ports 43 and 44. The mixture leaves the mixer 20 through an outlet 45.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

I claim:

1. A method for preparing a paste-like compound comprised of at least a first constituent and a second constituent, the paste-like compound setting after the constituents that are initially present in separate storage containers have been mixed, and for injecting the setting, paste-like compound into an edge joint of an intermediate space between two glass panels of an insulating glass pane, by delivering the at least two constituents from the storage containers into separate intermediate storage units, from which the at least two constituents are delivered into a mixer, in which the at least two constituents are mixed with one another while passing through the mixer and the setting, paste-like compound leaving the mixer is injected into the edge joint of the intermediate space between the two glass panels by a nozzle comprising at least one opening, wherein the nozzle is directed into the intermediate space between the glass panels, while the nozzle is moved along the edge of at least one of the two glass panels, by means of a device for injecting a setting, paste-like compound into the intermediate space between the two glass panels, the device comprising:

a first pump for pumping the first constituent from a first container;

a first intermediate storage unit for the first constituent;

a first pressurizer for pressurizing the first intermediate storage unit to a first input pressure;

a first pump-storage unit duct from the first pump to the first intermediate storage unit;

a first motor driven gear pump for pumping the first constituent;

a first storage unit-gear pump duct;

a dynamic mixer, the dynamic mixer having a delivery direction on a longitudinal axis, a rotatable mixing shaft extending along the longitudinal axis and mixing elements extending from the mixer shaft and differing from 90° from the longitudinal direction to effect an advance in the delivering direction of an input of paste-like compounds in response to the rotation of the mixing shaft to reduce the loss of pressure which would occur where the mixing elements do not differ from 90° ;

a first gear pump-dynamic mixer duct extending between the first gear pump and the dynamic mixer;

a second pump for pumping the second constituent from a second container;

a second intermediate storage unit for the second constituent;

a second pump-storage unit duct from the second pump to the second intermediate storage unit;

a second pressurizer for pressurizing the second intermediate storage unit to a second input pressure;

a second motor driven gear pump for pumping the second constituent;

a second storage unit-gear pump duct; and a second gear pump-dynamic mixer duct extending between the second gear pump and the dynamic mixer;

wherein the dynamic mixer delivers mixed first constituent and second constituent, and wherein the device further includes a nozzle for receiving from the dynamic mixer and delivering to the joint edge of the intermediate space between the two glass panels the mixed first constituent and second constituent;

said method comprising the following steps:

actuating the first pump to pump the first constituent from a container to the first intermediate storage unit through the first pump-storage unit duct, and actuating the second pump to pump the second constituent from a container to the second intermediate storage unit through the second pump-storage unit duct;

actuating the first pressurizer to pressurize the first intermediate storage unit to the first input pressure, and actuating the second pressurizer to pressurize the second intermediate storage unit to the second input pressure;

actuating the first gear pump to deliver the first constituent from the first intermediate storage unit to the dynamic mixer, and actuating the second gear pump to deliver the second constituent from the second intermediate storage unit to the dynamic mixer; and actuating the dynamic mixer to dynamically mix the first constituent and the second constituent to form a setting compound, and to direct the dynamically mixed setting compound along a path going to the edge joint of the intermediate space between the glass panels of the insulating glass pane.

2. The method according to claim 1, wherein the method further comprises driving the first motor driven gear pump and the second motor driven gear pump synchronously.

3. The method according to claim 1, and further comprising the step of supplying the at least a first constituent of the setting, paste-like compound at a first preselected certain input pressure at an input side of the first motor driven gear pump and a second constituent of the setting, paste-like compound at a second preselected certain input pressure at an input side of the second motor driven gear pump.

4. The method according to claim 3, and further comprising the step of holding the first preselected certain input pressure of the first motor driven gear pump and the second preselected certain input pressure of the second gear pump constant.

5. The method according to claim 3, wherein the first preselected certain input pressure and the second preselected certain input pressure equal each other.

6. The method according to claim 3, further comprising the step of applying a first preselected certain input pressure of from 20 to 50 bar to the first motor driven gear pump and a second preselected certain input pressure of from 20 to 50 bar to the second motor driven gear pump.

7. The method according to claim 3, further comprising the step of applying a preselected certain input pressure of from 25 to 45 bar to the first and second motor driven gear pumps.

8. The method according to claim 3, further comprising the step of applying a preselected certain input pressure of from 30 bar to 40 bar to the first and second motor driven gear pump.

9. The method according to claim 1, and further comprising the step of applying a first preselected input pressure reference value to an input side of the first gear pump, for regulating the first input pressure to the first preselected input pressure reference value.

10. The method according to claim 9, and further comprising the step of applying a second preselected input pressure reference value to an input side of the second gear pump, for regulating the second preselected pressure to the second preselected input pressure reference value.

11. The method according to claim 3, wherein the first gear pump has a first gear pump output pressure and the second gear pump has a second gear pump output pressure, and wherein the method further comprises the step of coordinating the operation of the first gear pump and the second gear pump and the dynamic mixer to obtain a first gear pump output pressure in the at least first of the at least two constituents and a second gear pump output pressure of the second constituent, wherein the first constituent and the second constituent are to be mixed with one another, and wherein the first gear pump output pressure and the second gear pump output pressure are greater than the respective first preselected certain input pressure and second preselected certain input pressure.

12. The method according to claim 11, wherein the respective first gear pump output pressure and second gear pump output pressure in the at least two constituents, to be mixed, is up to 20 bar higher than the respective first preselected certain input pressure and second preselected certain input pressure.

13. The method according to claim 11, wherein the respective first gear pump output pressure and the second gear pump output pressure in the at least two constituents, to be mixed, is up to 10 bar higher than the respective first preselected certain input pressure and second preselected certain pressure.

14. The method according to claim 1, wherein the first input pressure is a preselected first input pressure and the second input pressure is a preselected second input pressure further comprising the step of coordinating the preselected first input pressure of the first gear pump and a first output pressure of the first gear pump, and the preselected second input pressure of the second gear pump and a second output pressure of the second gear pump to obtain a pressure difference between the preselected first input pressure and the first output pressure that is substantially 0 and a pressure difference between the preselected second input pressure and the second output pressure that is substantially 0.

15. The method according to claim 14, further comprising the steps of adjusting the preselected first input pressure to obtain a constant preselected first input pressure by changing the speed of the first gear pump for minimizing the difference between the preselected first input pressure and the first output pressure of the first gear pump, and of adjusting the preselected second input pressure by changing the speed of the second gear pump for minimizing the difference between the preselected second input pressure and the second output pressure of the second gear pump.

16. The method according to claim 14, further comprising the step of controlling the difference between the preselected first input pressure at the input of the first gear pump and the first output pressure of the first gear pump to yield the value zero as a first setpoint value, and controlling the difference between the value of the preselected second input pressure of the second gear pump and the second pressure output of the second gear pump to yield the value zero as a second setpoint value.

17. The method according to claim 1, comprising the step of using a paste-like, setting compound to seal an insulating glass pane, wherein at least one constituent of said at least two constituents contains a mineral filler.

18. The method according to claim 1, further comprising the step of forming the setting compound from two constituents.

19. The method according to claim 18, further comprising the step of preparing polyurethane as the setting compound.

20. The method according to claim 18, further comprising the step of preparing a polysulfide as the setting compound.

21. The method according to claim 18, further comprising the step of preparing a silicone as the setting compound.

22. The method according to claim 14, and further comprising the step of coordinating the preselected first input pressure of the first gear pump and the preselected second input pressure of the second gear pump and the first output pressure at the output of the first gear pump and the second output pressure at the output of the second gear pump, to obtain a pressure difference between the first preselected input pressure and the first pressure that is zero, and to obtain a pressure difference between the preselected second input pressure and the second output pressure that is zero.

23. The method according to claim 17, further comprising the step of using a setting paste-like , compound to seal an insulating glass pane, wherein at least one constituent of said at least two constituents contains at least one a mineral filler selected from the group consisting of rock flour and lime powder.

24. A method for preparing a paste-like compound comprised of at least a first constituent and a second constituent, the paste-like compound setting after the constituents that are initially present in separate storage containers have been mixed, and for injecting the setting, paste-like compound into an edge joint of an intermediate space between two glass panels of an insulating glass pane, by delivering the at least two constituents from the storage containers into separate intermediate storage units, from which separate intermediate storage units the at least two constituents are delivered into a dynamic mixer, in which dynamic mixer the at least two constituents are mixed with one another while passing through the dynamic mixer and the setting, paste-like compound leaving the mixer is injected into the edge joint of the intermediate space between the two glass panels by a nozzle comprising at least one opening, wherein the nozzle is directed into the intermediate space between the glass panels, while the nozzle is moved along the edge of at least one of the two glass panels, by means of a device for injecting a setting, paste-like compound into the intermediate space between the two glass panels, the device comprising:
  a first pump for pumping the first constituent from a first container;
  a first intermediate storage unit for receiving the first constituent pumped by the first pump;
  a first pressurizer for pressurizing the first intermediate storage unit to a first input pressure;
  a first motor driven gear pump actuable for pumping the first constituent from the first intermediate storage unit;
  a first pump-storage unit duct from the first pump to the first intermediate storage unit;
  a dynamic mixer having a delivery direction on a longitudinal axis, a rotatable mixing shaft extending along the longitudinal axis and mixing elements extending from the mixer shaft and differing from 90° from the longitudinal direction to effect an advance in the delivering direction of an input of paste-like compounds in response to the rotation of the mixing shaft to reduce the loss of pressure which would occur where the mixing elements do not differ from 90° ;
  a first gear pump-dynamic mixer duct extending between the first gear pump and the dynamic mixer;
  a second pump for pumping the second constituent from a second container;
  a second intermediate storage unit for receiving the second constituent pumped by the second pump;
  a second pressurizer for pressurizing the second intermediate storage unit to a second input pressure;
  a second pump-storage unit duct from the second pump to the second intermediate storage unit;
  a second motor driven gear pump for pumping the second constituent;
  a second storage unit-gear pump duct; and
  a second gear pump-dynamic mixer duct extending between the second gear pump and the dynamic mixer;
  wherein the dynamic mixer delivers mixed first constituent and second constituent, and
  wherein the device further includes a nozzle for receiving from the dynamic mixer and delivering to the joint edge of the intermediate space between the two glass panels, the mixed first constituent and second constituent;
said method comprising the following steps:
  actuating the first pump to pump the first constituent to the first intermediate storage unit through the first pump-storage unit duct, and actuating the second pump to pump the second constituent to the second intermediate storage unit through the second pump-storage unit duct;
  actuating the first pressurizer to pressurize the first intermediate storage unit to a preselected first input pressure, and actuating the second pressurizer to pressurize the second intermediate storage unit to a preselected second input pressure;
  actuating the first gear pump to have the first constituent delivered from the first intermediate storage unit to the dynamic mixer, and actuating the second gear pump to have the second constituent delivered from the second intermediate storage unit to the dynamic mixer;
  actuating the dynamic mixer to dynamically mix the first constituent and the second constituent to form a setting compound, and to direct the dynamically mixed setting compound along a path going to the edge joint of the intermediate space between the glass panels; and
  compensating for any loss of pressure across the dynamic mixer to obtain a negligible loss of pressure across the dynamic mixer.

25. A method for preparing a paste-like compound comprised of at least a first constituent and a second constituent, the paste-like compound setting after the constituents that are initially present in separate storage containers have been mixed, and for injecting the setting, paste-like compound into an edge/joint of an intermediate space between two glass panels of an insulating glass pane, by delivering the'at least two constituents from the storage containers into separate intermediate storage units, from which separate intermediate units the at least two constituents are delivered into a dynamic mixer, in which dynamic mixer the at least two constituents are mixed with one another while passing through the dynamic mixer and the setting, paste-like compound leaving the dynamic mixer is injected into the edge joint of the intermediate space between the two glass panels by a nozzle comprising at least one opening, wherein the nozzle is directed into the intermediate space between the glass panels, while the nozzle is moved along the edge of at least one of the two glass panels, by means of a device for injecting a setting, paste-like compound into the intermediate space between the two glass panels, the device comprising:

- a first pump for pumping the first constituent from a first container;
- a first intermediate storage unit for receiving the first constituent pumped by the first pump;
- a first pressurizer for pressurizing the first intermediate storage unit to a first input pressure;
- a first motor driven gear pump actuable for pumping the first constituent from the first intermediate storage unit;
- a first pump-storage unit duct from the first pump to the first intermediate storage unit;
- a first-storage unit-gear pump duct;
- a dynamic mixer having a delivery direction on a longitudinal axis, a rotatable mixing shaft extending along the longitudinal axis and mixing elements extending from the mixer shaft and differing from 90° from the longitudinal direction to effect an advance in the delivering direction of an input of paste-like compounds in response to the rotation of the mixing shaft to reduce the loss of pressure which would occur where the mixing elements do not differ from 90°;
- a first gear pump-dynamic mixer duct extending between the first gear pump and the dynamic mixer;
- a second pump for pumping the second constituent from a second container;
- a second intermediate storage unit for receiving the second constituent pumped by the second pump;
- a second pressurizer for pressurizing the second intermediate storage unit to a second input pressure;
- a second pump-storage unit duct from the second pump to the second intermediate storage unit;
- a second motor driven gear pump for pumping the second constituent;
- a second storage unit-gear pump duct; and
- a second gear pump-dynamic mixer duct extending between the second gear pump and the dynamic mixer;
- wherein the dynamic mixer delivers mixed first constituent and second constituent, and
- wherein the device further includes a nozzle for receiving from the dynamic mixer and delivering to the joint edge of the intermediate space between the two glass panels, the mixed first constituent and second constituent;

said method comprising the following steps:
- actuating the first pump to pump the first constituent to the first intermediate storage unit through the first pump-storage unit duct, and actuating the second pump to pump the second constituent to the second intermediate storage unit through the second pump-storage unit duct;
- actuating the first pressurizer to pressurize the first intermediate storage unit to a preselected first input pressure, and actuating the second pressurizer to pressurize the second intermediate storage unit to a preselected second input pressure;
- actuating the first gear pump to have the first constituent delivered from the first intermediate storage unit to the dynamic mixer, and actuating the second gear pump to have the second constituent delivered from the second intermediate storage unit to the dynamic mixer;
- actuating the dynamic mixer to dynamically mix the first constituent and the second constituent to form a setting compound, and to direct the dynamically mixed setting compound along a path going to the edge joint of the intermediate space between the glass panels; and
- coordinating the preselected first input pressure and the first output pressure of the first gear pump and the preselected second input pressure and the second output pressure of the second gear pump forming the difference between the first input pressure and the first output pressure as well as the difference between the second input pressure and the second output pressure, and compensating for any loss of pressure across the dynamic mixer to obtain a negligible total loss of pressure across both first and second gear pumps and the dynamic mixer.

26. A method for preparing a paste-like compound comprised of at least a first constituent and a second constituent, the paste-like compound setting after the constituents that are initially present in separate storage containers have been mixed, and for injecting the setting, paste-like compound into an edge joint of an intermediate space between two glass panels of an insulating glass pane, by delivering the at least two constituents from the storage containers into separate intermediate storage units, from which separate intermediate units the at least two constituents are delivered into a dynamic mixer, in which dynamic mixer the at least two constituents are mixed with one another while passing through the dynamic mixer and the setting, paste-like compound leaving the dynamic mixer is injected into the edge joint of the intermediate space between the two glass panels by a nozzle comprising at least one opening, wherein the nozzle is directed into the intermediate space between the glass panels, while the nozzle is moved along the edge of at least one of the two glass panels, by means of a device for injecting a setting, paste-like compound into the intermediate space between the two glass panels, the device comprising:

- a first pump for pumping the first constituent from a first container;
- a first intermediate storage unit for receiving the first constituent pumped by the first pump;
- a first pressurizer for pressurizing the first intermediate storage unit to a first input pressure;
- a first motor driven gear pump for pumping the first constituent from the first intermediate storage unit;
- a first pump-storage unit duct from the first pump to the first;
- a dynamic mixer having a delivery direction on a longitudinal axis, a rotatable mixing shaft extending along the longitudinal axis and mixing elements extending from the mixer shaft and differing from 90° from the longitudinal direction to effect an advance in the delivering direction of an input of paste-like compounds in response to the rotation of the mixing shaft to reduce the loss of pressure which would occur where the mixing elements do not differ from 90°;
- a first gear pump-dynamic mixer duct extending between the first gear pump and the dynamic mixer;
- a second pump for pumping the second constituent from a second container;
- a second intermediate storage unit for receiving the second constituent pumped by the second pump;
- a second pressurizer for pressurizing the second intermediate storage unit to a second input pressure;
- a second pump-storage unit duct from the second pump to the second intermediate storage unit;

a second motor driven gear pump for pumping the second constituent;

a second storage unit-gear pump duct; and a second gear pump-dynamic mixer duct extending between the second gear pump and the dynamic mixer;

wherein the dynamic mixer delivers mixed first constituent and second constituent, and wherein the device further includes a nozzle for receiving from the dynamic mixer and delivering to the joint edge of the intermediate space between the two glass panels, the mixed first constituent and second constituent;

said method comprising the following steps:

actuating the first pump to pump the first constituent to the first intermediate storage unit through the first pump-storage unit duct, and actuating the second pump to pump the second constituent to the second intermediate storage unit through the second pump-storage unit duct;

actuating the first pressurizer to pressurize the first intermediate storage unit to a preselected the first input pressure, and actuating the second pressurizer to pressurize the second intermediate storage unit to a preselected second input pressure;

actuating the first gear pump to have the first constituent delivered from the first intermediate storage unit to the dynamic mixer, and actuating the second gear pump to have the second constituent delivered from the second intermediate storage unit to the dynamic mixer;

actuating the dynamic mixer to dynamically mix the first constituent and the second constituent to form a setting compound, and to direct the dynamically mixed setting compound along a path going to the edge joint of the intermediate space between the glass panels;

coordinating the preselected first input pressure and the first output pressure of the first gear pump and the preselected second input pressure and the second output pressure of the second gear pump, and adjusting the preselected first input pressure to obtain a constant preselected first input pressure by changing the speed of the first gear pump for minimizing the difference between the preselected first input pressure and the first output pressure of the first gear pump, and by adjusting the preselected second input pressure by changing the speed of the second gear pump for minimizing the difference between the preselected second input pressure and the second output pressure of the second gear pump.

* * * * *